June 23, 1953  D. B. BELL  2,643,025
CONTROL FOR CLOSED VESSELS
Filed Aug. 1, 1949
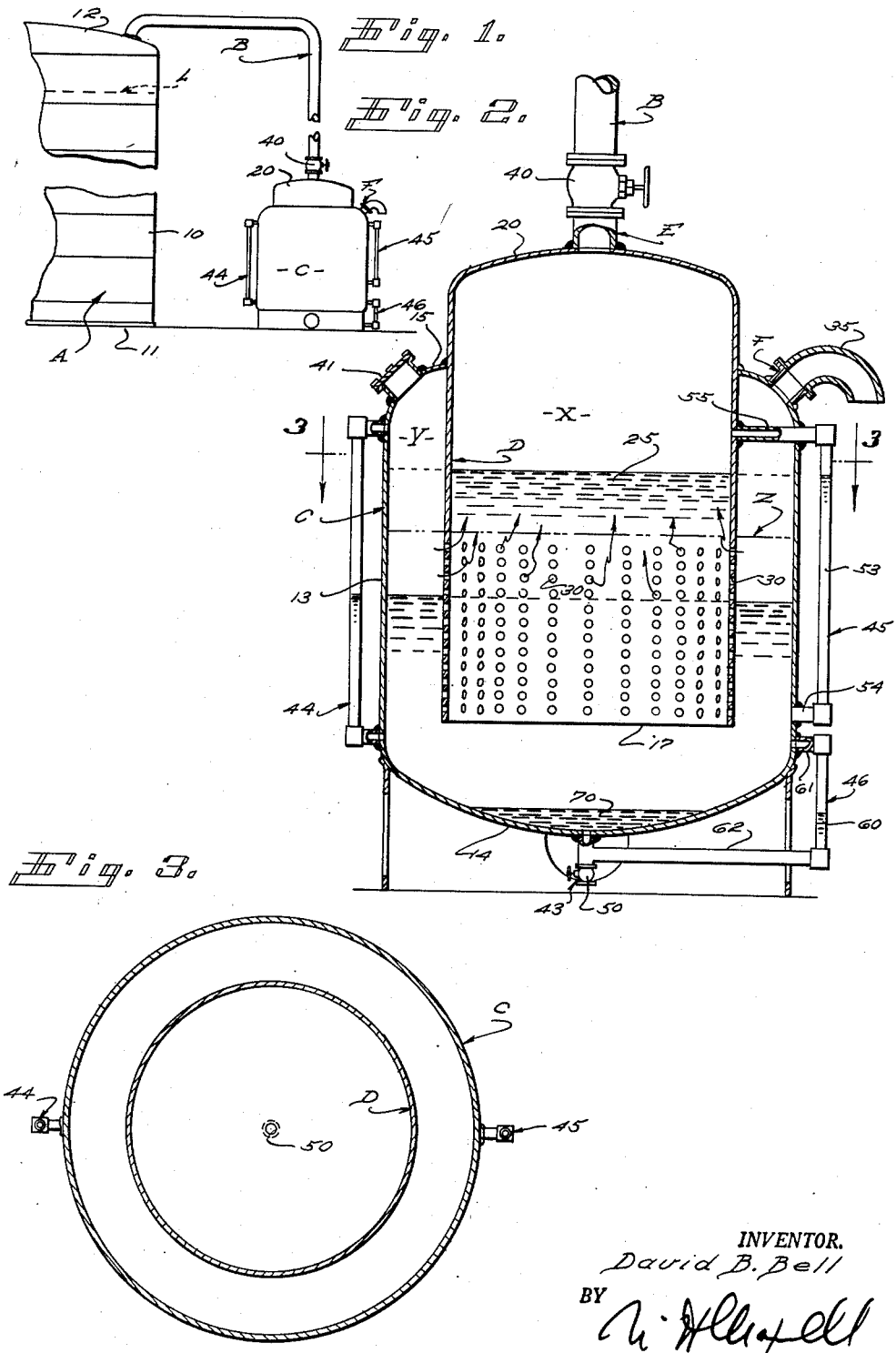
INVENTOR.
David B. Bell
BY
Attorney Patented June 23, 1953

2,643,025

UNITED STATES PATENT OFFICE 2,643,025

CONTROL FOR CLOSED VESSELS

David B. Bell, Long Beach, Calif.

Application August 1, 1949, Serial No. 107,844

4 Claims. (Cl. 220—85)

This invention is concerned with controls for use on or in connection with closed vessels and it is a general object of the invention to provide a simple, dependable control acting to seal a vessel and at the same time maintain a substantially uniform pressure on liquid carried therein.

Closed vessels such as storage tanks are employed in many situations to carry liquids and in most cases such vessels are not maintained completely full but rather the liquid level is below the top of the tank to provide a chamber carrying gas. In many situations the gas chamber is essential in order to compensate for changes in volume of the liquid due to expansion and contraction resulting from changes in temperature, as between day and night, etc.

The present invention provides a control for use on or in connection with a closed vessel carrying a body of liquid so that there is a gas filled chamber in the vessel. The control is characterized by two vertical chambers of equal area or capacity handling a single body of control liquid, one of the chambers being in communication with the upper end of the closed vessel, as by means of a duct. In a preferred form there is a vertically disposed tank which is closed and which has a partition depending into it from its top. The vertical wall of the tank may be cylindrical and the partition may be cylindrical and the cylindrical parts are related so that the area within the partition is equal to that between the partition and the wall of the tank. It is preferred that the partition have two sections, one an upper imperforate section and the other a lower foraminous section, the foraminous section starting from a point immediately below the normal level of the control liquid. Openings or connections are provided into the upper ends of the chambers and one is open to atmosphere while the other is connected with the vessel by a duct. Liquid level gauges are provided indicating the level of control liquid in each chamber and a liquid level gauge is provided at the bottom of the tank to indicate the presence of sediment therein.

It is a general object of the present invention to provide a control for a closed liquid carrying vessel which control is in communication with the gas filled chamber occurring in the vessel above the liquid therein and acts to maintain a substantially uniform pressure in the said chamber of the vessel.

It is another object of the invention to provide a control of the general character referred to wherein there is a body of control liquid which acts to scrub gases passing through the control, as for instance gases passing out of the vessel, to relieve excess pressure or air as it is admitted to the vessel, to prevent development of a negative pressure. The scrubbing action of the control may be such as to absorb vapors, or the like, in gases passing out through the control or to trap liquid such as water vapor, or the like, in air admitted to the vessel.

It is a further object of the invention to provide a control of the general character referred to involving a plurality of gauges enabling an operator to accurately and immediately determine the exact operating condition of the control.

It is another object of this invention to provide a control of the general character referred to which is simple and inexpensive of construction and which is free of complicated or delicate working parts such as floats, valves, levels, etc.

The various objects and features of my invention will be fully understood from the following detailed description of a typical preferred form and application of the invention, throughout which description reference is made to the accompanying drawings, in which:

Fig. 1 is a view showing a portion of a liquid carrying vessel with a typical form of control embodying the present invention coupled to the vessel to control it. Fig. 2 is an enlarged vertical sectional view of the control of the present invention, and Fig. 3 is a transverse sectional view taken as indicated by line 3—3 on Fig. 2.

The control of the present invention may be applied to closed vessels, or the like, employed in various situations. However, it is particularly practical as applied to liquid storage vessels such as are employed to handle petroleum or petroleum derivatives. In the drawings I illustrate a vessel A in the form of a storage tank which is of a type suitable for the handling of petroleum or petroleum products, the vessel being formed of a vertically disposed side wall 10, a bottom 11 and a top 12. A body of stored liquid is carried in the vessel so that the top or level L of the liquid is below the top 12 of the vessel, leaving a gas filled chamber in the vessel at the top thereof.

The control provided by the present invention involves, essentially, two vertically disposed chambers X and Y of equal cross sectional area, one of the chambers being open to atmosphere while the other is connected with the top or upper end of the vessel A by a duct B. A body of control liquid is related to the chambers X and Y to check or control flow between the chambers. In the preferred form of the invention the control involves, generally, a tank C with a vertical side wall 13, a bottom 14 and a top 15. A partition D is located within the tank C dividing the interior of the tank into the chambers X and Y and couplings or connections E and F are provided in communication with the upper ends of chambers X and Y, respectively.

In its preferred form the body 13 of tank C is a vertically disposed cylindrical part while the bottom 14 of the tank is concave or basin-like, as clearly illustrated in Fig. 2 of the drawings. In the case illustrated the partition D is a vertically disposed cylindrical part carried by and depending from the top 15 of the tank C and it is proportioned so that its lower end 17 terminates above the bottom 14 of the tank. The upper end of the partition D is closed by a part or wall 20 which may be considered as a part of continuation of the top 15 of the tank, although the part 20 is shown as being located somewhat above the part of the tank top which adjoins the side wall 13.

In the case illustrated the cylindrical partition D is located concentrically relative to the cylindrical side wall or body of the tank C and these parts are related so that the area of chamber X which occurs within the partition D is equal to that of chamber Y which occurs between the body 13 of the tank and the partition D.

A body of control liquid 25 is carried in the structure just described, that is, in the tank C, and when equal pressures occur in the chambers X and Y the level of the control liquid is at the point indicated by the line Z in Fig. 2 of the drawings. As the control operates a pressure differential may develop between chambers X and Y, in which case the liquid level in chamber X will vary from that in chamber Y. An extreme condition is indicated in Fig. 2 where the pressure in chamber Y is substantially greater than that in chamber X, with the result that the liquid level in chamber X is well above that in chamber Y.

In accordance with the present invention provision is made for transfer or flow of control liquid between chambers X and Y in order to normally maintain the level in both chambers closed to the line Z so that a substantially uniform pressure is maintained in the vessel A. In the form of the invention illustrated the partition D is divided into upper and lower sections, the upper section being imperforate and the lower section being foraminous. The foraminous portion of the partition D extends from a point immediately below the line Z to the lower end 17 of the partition and it may be characterized by a plurality of small openings or perforations 30 such as are shown in Fig. 2 of the drawings.

With the structure provided by the invention, lowering of the level of the control liquid in either chamber, that is, either in chamber X or chamber Y, results in uncovering the uppermost perforations of the foraminous section of the partition D with the result that gas flows from one chamber to the other, bubbling through liquid in the chamber where the level is highest. In the event that an extreme differential of pressure occurs and the difference in liquid levels in the two chambers is substantially as shown in Fig. 2 of the drawings, a considerable number of perforations 30 will be uncovered and there will be a substantial flow of gas between the partitions and through the control liquid, as indicated by the various small arrows in Fig. 2 of the drawings. It will be apparent that as a result of uncovering the perforations 30 and the partitions D the pressures in the chambers X and Y are quickly equalized and as a result, under normal conditions, the pressures in the two chambers are maintained within a close range.

The duct B that connects the structure just described with the vessel A may connect with either one of the chambers, that is, with either chamber X or chamber Y. In the particular case illustrated the duct B connects with connection or opening E at the upper end of chamber X while the connection or opening F at the upper end of chamber Y is open to atmosphere. The opening or connection at F is shown provided with a suitable protective fitting 35.

The invention provides suitable fittings or accessories in connection with the major parts above referred to. For example a control valve 40 may be provided in duct B, a suitably capped inlet fitting may be provided at 41 so that fluid may be added to the body C when desired, drain means for the body is provided at 43, a liquid level gauge 44 is provided to indicate the level of liquid in chamber Y, a liquid level gauge 45 is provided to indicate the level of liquid in chamber X, and a sediment gauge 46 is provided to indicate the presence and amount of sediment in the bottom of body C.

The drain at 43 is shown connected into the lowermost part of the concave bottom 14 of body C and is under control of a suitable valve 50.

The liquid level gauge 44 may be a simple or ordinary type of gauge applied directly to the exterior of the body 13 of the tank C so that its lower end is in communication with the body of control liquid well below the top thereof while its upper end is open with the interior of chamber Y well below the level of liquid therein. The gauge 44 will accurately indicate the liquid level in chamber Y as will be apparent from Fig. 2 of the drawings.

The liquid level gauge 45 as shown in the drawings may have a gauge glass 53 at the exterior of the body in communication with a lower connection 54 which connects with or is open to the body of control liquid in the lower portion of the tank C. A top connection 55 extends from the upper end of the glass 53 to the interior of the chamber X well above the level of control liquid therein. The gauge 45, as just described, will serve to accurately indicate the level of liquid in chamber X.

The gauge 46 indicates the presence and quantity of sediment in the bottom of the tank C in the event that sediment is precipitated by or out of the control liquid. The gauge 46 is shown as involving a gauge glass 60, and an upper connection 61 with the interior of the tank well above the lower end thereof. A lower connection 62 connects the lower end of the glass with the bottom or lowermost point of the tank. Sediment such as a body 70 of liquid or other material occurring in the bottom of the tank will be indicated by the gauge 46, as shown in Fig. 2 of the drawings.

From the foregoing description it will be apparent that the control connected with the vessel A as described will serve to normally prevent flow of gas either into or out of the vessel A, and thus seals the vessel. By reason of the construction of the control and the relationship of parts described, slight variation in pressure in the tank A above the liquid therein from atmospheric pressure results in flow through the control either to allow gas to escape from the vessel and thus lower pressure therein or to allow flow of gas into the vessel to build up pressure therein. It will be apparent that under ordinary conditions but slight variation in level of the control liquid occurs in the chambers X and Y, since the uppermost perforations 30 in the partition D are immediately below the normal level Z of the control liquid. Further, it will be apparent that when gas is flowing through the control in either direction it is scrubbed or cleaned by the action of the control liquid. In carrying out the present invention the control liquid may be a liquid that will absorb fumes or values in the gas passing out of the vessel A or it may be such as to effectively catch moisture from gas or air passing into the vessel A. As an example, if it is desired that air be admitted to the vessel A be free of water or moisture turbine oil, or the like, may be used as the control liquid. Such a liquid or oil will effectively trap moisture and drop it to form a precipitate 70 in the lower end of tank C and such precipitate 70 may be drained from the body from time to time so that its presence does not materially interfere with the desired action of the control. If a substantial amount of material is allowed to accumulate as a precipitate 70 in the bottom of the tank C it will disturb the normal level of control liquid and thus interfere with the desired action of the control.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A control for a closed liquid carrying vessel including, a closed vertically disposed tank confining a fixed charge of control liquid, the tank being round in cross-section, an annular partition in the tank concentric therewith and extending downwardly from the top of the tank into the control liquid and dividing the interior of the tank into two vertical chambers of equal cross sectional area, and a duct from the top of one chamber to the top of the vessel, the top of the other chamber being open to atmosphere, the partition having a lower normally submerged foraminous portion terminating immediately below the normal level of control liquid and having an imperforate upper portion continuing from the lower portion to its upper end.

2. A control for a closed liquid carrying vessel including, a closed tank confining a fixed charge of control liquid, a partition in the tank dividing it into two vertical chambers of equal cross sectional area, there being an opening through the partition immediately below the normal level of the control liquid, and a duct from the top of one chamber to the top of the vessel, the top of the other chamber being open to atmosphere, the tank having a cylindrical vertically disposed body closed at its upper end by a top and at its lower end by a bottom and the partition being cylindrical and vertically disposed centrally in the body of the tank and supported solely by the top of the tank.

3. A control for a closed liquid carrying vessel including, a closed tank confining a fixed body of control liquid, a partition in the tank extending into the control liquid and dividing the interior of the tank into two vertical chambers of equal cross sectional area, and a duct from the top of one chamber to the top of the vessel, the top of the other chamber being open to atmosphere, the partition having a lower normally submerged foraminous portion terminating immediately below the normal level of control liquid and having an imperforate upper portion continuing from the lower portion to its upper end, the tank having a cylindrical vertically disposed body closed at its upper end by a top and at its lower end by a bottom and the partition being cylindrical and vertically disposed centrally in the body of the tank and being supported solely by the top of the tank and depending therefrom.

4. A control for a closed liquid carrying vessel including, a closed tank with a top and a cylindrical vertically disposed body and confining a fixed charge of control liquid, a cylindrical partition carried by the top and depending into the liquid concentric with the body and dividing the interior of the tank into two equal chambers, a duct from one chamber to the top of the vessel, the other chamber being open to atmosphere, a gauge with an indicating part at the exterior of the tank and having a top connection with the interior of the tank above the liquid within the partition, and a gauge with an indicating part at the exterior of the tank and having a top connection with the interior of the tank above the liquid outside of the partition.

DAVID B. BELL.

References Cited in the file of this patent

UNITED STATES PATENTS

| Number | Name | Date |
|---|---|---|
| 1,534,448 | Hauser | Apr. 21, 1925 |
| 1,545,352 | Rodriguez | July 7, 1925 |
| 1,653,387 | Brown | Dec. 20, 1927 |
| 2,000,862 | Nichols | May 7, 1935 |
| 2,370,040 | Jackson | Feb. 20, 1945 |